United States Patent [19]

Ramachandran et al.

[11] Patent Number: 5,565,089
[45] Date of Patent: Oct. 15, 1996

[54] PROCESS FOR DECOKING CATALYSTS

[75] Inventors: Ramakrishnan Ramachandran, Allendale; Raghu K. Menon, Medford, both of N.J.

[73] Assignee: The BOC Group, Inc., New Providence, N.J.

[21] Appl. No.: 315,631

[22] Filed: Sep. 30, 1994

[51] Int. Cl.$^6$ .................................................. C10G 11/18
[52] U.S. Cl. ........................... 208/113; 208/106; 502/34; 502/42; 502/38; 502/41; 502/52; 110/345; 423/235; 423/247; 423/224
[58] Field of Search .................. 208/52 CT, 106, 208/113; 502/39, 38, 42, 52, 41; 110/345; 423/235, 245, 247, 224

[56] References Cited

U.S. PATENT DOCUMENTS

| | | | |
|---|---|---|---|
| 4,304,659 | 12/1981 | Pratt et al. | 208/164 |
| 4,354,925 | 10/1982 | Schorfherd | 208/140 |
| 4,388,218 | 6/1983 | Rowe | 208/50 |
| 4,412,914 | 11/1983 | Hettinger, Jr. et al. | 502/52 |
| 4,542,114 | 9/1985 | Hegarty | 502/34 |
| 4,902,845 | 2/1990 | Kim | 502/52 |
| 4,997,800 | 3/1991 | Child | 502/42 |
| 5,011,592 | 4/1991 | Owen et al. | 502/42 |
| 5,077,251 | 12/1991 | Owen et al. | 502/42 |
| 5,145,815 | 9/1992 | Zarchy | 502/52 |
| 5,308,473 | 5/1994 | Markham et al. | 502/42 |

*Primary Examiner*—Helane Myers
*Attorney, Agent, or Firm*—Coleman R. Reap; Larry R. Cassett

[57] ABSTRACT

Coke deposits are removed from particulates by combustion in a regenerator by a process in which air is initially used as the oxidant. The combustion gas is subjected to a separation process to remove nitrogen therefrom, and the remaining carbon dioxide-enriched gas stream is recycled to the regenerator together while substantially pure oxygen is introduced into the regenerator. As the level of carbon dioxide in the system increases, the amount of air being introduced into the regenerator is gradually reduced and, in compensation, the amount of oxygen flowing to the regenerator is gradually increased. Eventually, part or all of the air is replaced by oxygen and carbon dioxide recycle gas, and the level of oxygen and carbon dioxide are regulated to maintain the desired temperature in the regenerator.

22 Claims, 1 Drawing Sheet

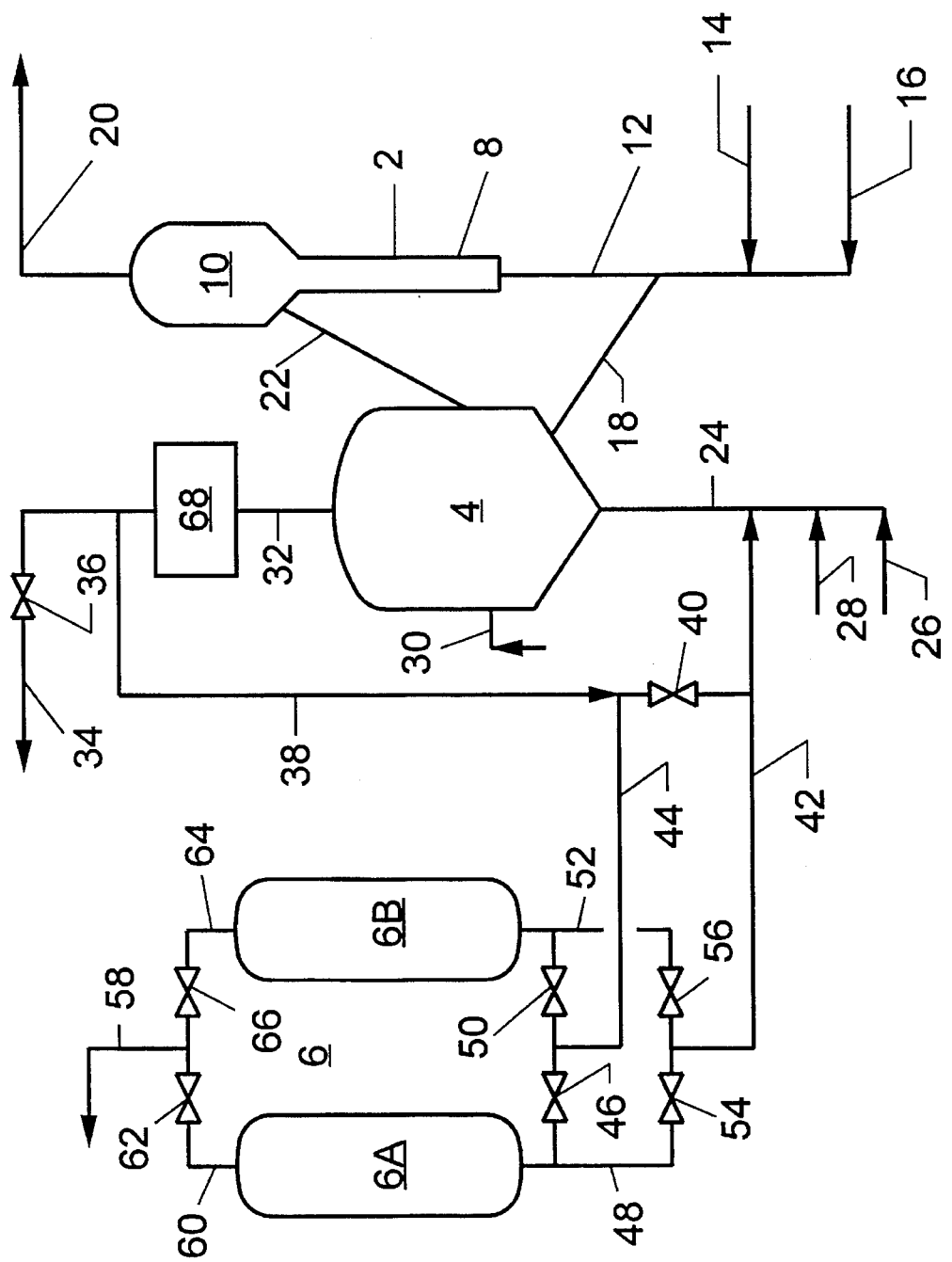

PROCESS FOR DECOKING CATALYSTS

FIELD OF THE INVENTION

This invention relates to the regeneration of catalysts, and more particularly to the removal of coke from spent catalyst by combustion.

BACKGROUND OF THE INVENTION

Certain petroleum refining processes, such as catalytic cracking, catalytic reforming, isomerization, etc. are carried out at elevated temperatures in the presence of a catalyst. In some of these processes coking of the catalyst occurs, i.e. coke is deposited onto the catalyst, with the result that over a period of time the catalyst gradually loses its activity. To restore the activity of the catalyst, the catalyst must be periodically regenerated, which is usually accomplished by combusting the coke at elevated temperatures in the presence of an oxygen-containing gas, such as air or oxygen-enriched air.

The catalytic process may be carried out by any one of various procedures; e.g. it may be a fixed bed process, in which case the catalytic reaction and catalyst regeneration are conducted in a single vessel, or it may be one of the moving catalyst processes, such as a transport bed process or a fluidized bed process, in which case the catalytic reaction is carried out in one vessel and catalyst regeneration is carried out in another vessel. A major advantage that moving catalyst processes have over fixed bed processes is that in moving bed processes, the reaction can be carried out continuously, whereas in fixed bed processes, the catalytic reaction must be terminated periodically to regenerate the catalyst.

In moving catalyst systems, the hydrocarbon feed and hot freshly regenerated catalyst, and perhaps steam, are continuously introduced into the reactor. The hot catalyst causes the hydrocarbon feed to react, thereby producing an array of valuable hydrocarbon products which may be of lower molecular weight than the hydrocarbon feed. During the course of the reaction the catalyst becomes fouled with coke deposits and loses its catalytic activity. The hydrocarbon products and fouled catalyst are separated and each leaves the reactor; the hydrocarbon products being sent to downstream hydrocarbon separation units to recover the various products, and the fouled catalyst being transported to a catalyst regenerator for removal of coke from the catalyst.

The effectiveness of the regenerator in burning coke off the catalyst directly determines the quality of performance of the hydrocarbon reaction (e.g. cracking) step. The regeneration step provides reactivated catalyst and heat for the endothermic hydrocarbon cracking step. The catalyst is heated during the regeneration step and the hot catalyst is transported to the reactor, where it contacts the hydrocarbon feed and causes the reactions to occur.

The amount of oxygen-containing gas (e.g. air) present in the regenerator determines the amount of coke that can be burned off the catalyst. The kinetics and efficiency of the combustion process also determines the steady-state concentrations of coke returned to the reactor on the reactivated catalyst, and the amount of coke on the spent catalyst entering the regenerator. In general, the more efficiently the catalyst is reactivated, the better its hydrocarbon reaction activity and selectivity will be, and the greater its ability to process heavier, poorer quality feedstock will be.

The rate of coke combustion is usually controlled by regulating the amount of oxygen entering the coke combustion zone during catalyst regeneration. Traditionally, catalyst regeneration has been carried out using air as the oxygen-containing gas. The nitrogen in air serves to remove heat from the reaction zone, thereby moderating the combustion. If it is desired to increase the rate of combustion, the flow of air through the regeneration zone is increased. This will have the sometimes undesirable effect of increasing the velocity of gas flowing through the combustion zone, which can cause excessive attrition and loss of the catalyst and excessive wear on equipment. To avoid these effects, some recent improvements have centered around the use of other oxygen-inert gas mixtures, such as oxygen-carbon dioxide mixtures for catalyst regeneration. Carbon dioxide has a greater heat capacity than nitrogen; accordingly the same amount of heat transfer can be effected with a lower volume of carbon dioxide than would be required using nitrogen, which means that the feed gas can be richer in oxygen. In the case of continuous regeneration processes, such as fluidized catalytic cracking, this provides an additional advantage in that additional hydrocarbon can be processed in a cracking reactor of given size. The use of oxygen-carbon dioxide mixtures in FCC units is discussed in U.S. Pat. Nos. 4,304,659 and 4,388,218. U.S. Pat. No. 4,354,925 discloses the use of mixtures of oxygen and carbon dioxide to regenerate catalytic reformer noble metal catalyst.

One of the difficulties associated with the use of oxygen-carbon dioxide mixtures is providing sources of oxygen and carbon dioxide. Oxygen can be easily generated by an on-site oxygen generator. The viability of an oxygen carbon dioxide-based regeneration process is determined by the ability to obtain carbon dioxide economically. Carbon dioxide can also be provided by recycling carbon dioxide produced during the combustion of the coke deposits, as taught in U.S. Pat. No. 4,542,114. This patent states that in some cases diluent carbon dioxide can be imported into the system.

The above-described prior art references discuss the operation of decoking processes using mixtures of pure oxygen and carbon dioxide, but none of the references discuss the most important aspect, i.e. how the operating mixture of oxygen and carbon dioxide is initially attained. The present invention provides an efficient and economical method of starting up an oxygen and carbon dioxide-based catalyst decoking process.

SUMMARY OF THE INVENTION

The present invention provides a process for removing coke deposits from particulate matter, and is particularly useful for regenerating coked catalyst used in petroleum processing operations.

The process comprises a first step in which the particulate matter is heated by combusting a fuel with air in the presence of the particulate matter. The combustion produces a gaseous exhaust mixture comprised of nitrogen and carbon dioxide. The exhaust gas also usually contains small amounts of other impurities, such as sulfur oxides and nitrogen oxides. The exhaust gas exits the regenerator and is next introduced into a separating device wherein nitrogen is separated from the other components of the exhaust gas and discharged to the atmosphere, or otherwise disposed of. All or a portion of the remaining gas stream, which is comprised predominantly of carbon dioxide, is recycled to the reactor, with simultaneous introduction of oxygen into the reactor.

As the volume of carbon dioxide and oxygen entering the reactor increases, the flow of air to the reactor is reduced. The relative amount of each gas entering the reactor is regulated to maintain the combustion rate at the desired level. Eventually, the desired degree of air replacement by oxygen and carbon dioxide recycle gas is attained; afterwards the amounts of oxygen and carbon dioxide, and perhaps air, introduced into the reactor are regulated to optimize the overall process.

The conversion from air operation to operation with oxygen and carbon dioxide may take place with the system already in operation with air being used as the source of oxygen, or with the system being started cold. In the former case, the coke on the particulate matter will serve as fuel for the production of carbon dioxide. This embodiment can be practiced with batch or continuous processes.

When the process is started cold, it can be initiated using fresh particulate matter or with equilibrium particulate matter, i.e. particulate matter from an earlier run which is clean or fouled with coke. In either case, a liquid or gaseous hydrocarbon fuel, such as fuel oil, can be used for the production of carbon dioxide and to heat the particulate matter to the desired operating temperature. When the temperature reaches the point at which the coke begins to burn, the use of fuel can be terminated and the process continued using the coke as fuel. This embodiment is particularly suitable when the process is continuous, e.g. when the process is a fluidized catalytic reaction process with freshly regenerated catalyst being transferred from a catalyst regenerator to a cracking reactor and coked catalyst being transferred from the reactor to the regenerator.

When the system reaches equilibrium, a mixture of oxygen and carbon dioxide, or oxygen, carbon dioxide and air (or other oxygen-inert gas mixtures) can be used to support the coke combustion step.

Carbon dioxide can be separated from the lighter constituents by any suitable means, including adsorption, absorption, liquefaction, distillation or membrane separation. In a preferred embodiment, the separation is effected by pressure swing adsorption (PSA) using an adsorbent selected from silica gel, activated alumina, zeolites or mixtures of these, which preferentially adsorbs carbon dioxide over other constituents of the exhaust gas. In a most preferred embodiment the PSA separation uses silica gel adsorbent.

In another preferred embodiment, the particulate matter is a hydrocarbon cracking catalyst and the catalyst regeneration step is part of a continuous process comprising a catalytic hydrocarbon processing step in which the catalyst becomes fouled with coke, and a catalyst regeneration step, in which the coke deposits are burned off of the catalyst. In a most preferred embodiment of the invention, the process is a fluidized catalytic cracking process.

BRIEF DESCRIPTION OF THE DRAWING

The drawing FIGURE illustrates, in a schematic diagram, one embodiment of a system for regenerating fluid cracking catalyst by the process of the invention.

DETAILED DESCRIPTION OF THE INVENTION

The present invention applies to the decoking of any carbon-coated particulate material, including catalyst materials such as fluidized catalytic cracking (FCC) catalysts, reformer catalysts, coking catalysts, etc., but for ease of description, the invention will be described in detail as it applies to the regeneration of FCC catalysts.

The invention can be better understood by reference to the appended drawing. Auxiliary equipment that is unnecessary for an understanding of the invention, including valves, compressors, heat exchangers and waste heat boilers, have been omitted from the drawing to simplify discussion of the invention. The drawing illustrates a hydrocarbon fluidized bed catalytic cracking system comprised principally of catalytic cracking reactor 2, catalyst regenerator 4 and nitrogen gas separator 6.

Riser-reactor 2 may be any fluidized bed catalytic cracking reactor. In the drawing it is depicted as a riser-type reactor having riser section 8 and disengagement section 10. Disengagement section 10 functions to separate the cracked gas product from the coked catalyst. To this end, it is equipped with one or more cyclone separators (not shown), which are positioned near its upper end. Subsequent to this disengagement, hydrocarbon vapors entrained with the catalyst are stripped therefrom with steam. Riser section 8 is equipped on its lower end with reactant supply line 12, which is provided with hydrocarbon feed line 14 and steam line 16. Regenerated catalyst transport conduit 18 provides fluid communication between regenerator 4 and reactant supply line 12. Disengagement section 10, positioned at the top end of riser 8, is provided at its upper end with hydrocarbon product discharge line 20 and at its lower end with spent catalyst transport line 22, which is connected to regenerator 4.

Regenerator 4 is any typical fluidized bed catalyst regenerator, and it is generally equipped with one or more cyclone separator systems (not shown). The cyclone separators function to recover catalyst from the regenerator exhaust gas. Design, construction and operating details of the above-described units are well known to those knowledgeable in the field of fluid catalytic cracking, and they form no part of the present invention.

Regenerator 4 is equipped with regenerator feed gas line 24, which is provided with air supply line 26 and oxygen supply line 28. Regenerator 4 is also provided with fuel inlet line 30, which is connected to one or more fuel injection nozzles positioned inside of regenerator 4 (not shown), and exhaust gas line 32, which is located at the top of the regenerator. Line 32 is connected to optional carbon monoxide boiler 68, and the outlet of the CO boiler is connected to vent line 34, flow through which is controlled by valve 36, and to line 38, which, in turn, is connected via valve 40 to carbon dioxide recycle line 42. Line 42 joins feed gas line 24. Line 44 joins line 38 to separator 6.

Separator 6 may be any device which functions to separate nitrogen from carbon dioxide. Typical of the commonly used separation means are adsorption units, absorption units, distillation units, chilling condensers, and semipermeable membrane units. Adsorption units are preferred over other types of separators because they require less capital expenditure and are less expensive to operate, and adsorption is more easily adapted to the dynamic conditions encountered during startup of the system. They have the additional advantage over cryogenic distillation units and chilling condensers of being operable at temperatures and pressures similar to those of the process stream. Thus, there is no need to cool the hot exhaust gas leaving regenerator 4 to cryogenic temperatures, and then heat the separated carbon dioxide-rich gas product gas from separator 6 to temperatures at which it is suitable for introduction into regenerator 4, which is a major advantage. Adsorption units have the advantages over membrane units of requiring require less maintenance and being operable at relatively low pressures. In preferred embodiments of the invention, separator 6 is a pressure swing adsorption (PSA) system. Most preferred adsorbents include silica gel and activated carbon.

When separator 6 is a PSA system, it may be comprised of a single adsorber or a battery of adsorbers arranged in parallel and/or in series. In preferred embodiments, separator 6 comprises two or more adsorbers arranged in parallel and cycled out of phase to provide a pseudo continuous flow of carbon dioxide-rich gas. In the drawing, separator 6 is shown as being comprised of two adsorption vessels, 6A and 6B, which are arranged in parallel and designed to be operated in alternate adsorption-desorption service.

Pressure swing adsorption is well known for separating the components of a mixture of gases by virtue of the difference in the degree of adsorption among them on a particulate adsorbent retained in a stationary bed. Typically, two or more such beds are operated in a cyclic process comprising adsorption under relatively high pressure and desorption or bed regeneration under relatively low pressure or vacuum. The cycle may contain steps other than the fundamental steps of adsorption and regeneration. The design, construction and operating details of separator 6, whether it be a pressure swing adsorption system or another type of separation system, are likewise well known and form no part of the invention.

The adsorption embodiment of the invention can be carried out using any adsorbent or mixture of adsorbents that selectively adsorb carbon dioxide from mixtures of carbon dioxide and nitrogen. Suitable adsorbents include molecular sieves, activated carbons, activated clays, silica gels, activated aluminas, etc. Molecular sieves include aluminophosphates, silicoaluminophosphates, and zeolites. Typical zeolites include natural zeolites, such as chabazite, clinoptilolite, erionite, faujasite, mordenite, etc., and synthetic zeolites, such as type X zeolites, type A zeolites, and type Y zeolites. Preferred adsorbents include silica gel, activated carbon, activated alumina, zeolite molecular sieves and mixtures of these.

When the adsorbent is a molecular sieve, it is often desirable to combine it with a binder. Any natural or synthetic binder material or mixture of materials can be used as binder for the adsorbent. Typical binders include metal oxides, clays, silicas, aluminas, etc. Suitable clay binders include kaolin, bentonite, montmorillonite, attapulgite, etc. The choice of binder and methods of agglomerating the adsorbent and binder are well known to those skilled in the art and form no part of the invention.

The adsorption process is generally carried out at temperatures in the range of about 0° to about 200° C., and preferably at temperatures in the range of about 15° to about 150° C. The adsorption step of the cycle is usually carried out at absolute pressures in the range of about 1 to about 10 bar, and is preferably carried out at absolute pressures in the range of about 2 to about 5 bar. The adsorbent regeneration step of the cycle is generally carried out at an absolute pressure of about 200 to about 3000 torr, and is preferably carried out at an absolute pressure in the range of about 200 to about 2000 torr.

Line 44 of the system illustrated in the drawing figure is connected to adsorber vessel 6A through feed valve 46 and feed line 48, and to adsorber vessel 6B through feed valve 50 and feed line 52. Carbon dioxide recycle line 42 is connected to adsorber 6A through valve 54 and line 48, and to adsorber 6B through valve 56 and line 52. Vessels 6A and 6B are connected to nitrogen vent line 58 through line 60 and valve 62, and line 64 and valve 66, respectively.

The exhaust gas outlet of regenerator 4 is usually provided with cooling means (not shown) to recover heat from the waste gas and to reduce the temperature of the gas to the range at which the separation in separation 6 is to be carried out. It is sometimes desirable to operate regenerator 4 under conditions that produce significant quantities of carbon monoxide. In such cases some or all of the carbon monoxide can be combusted or converted to carbon dioxide in carbon monoxide reactor 68, which, in the embodiment illustrated, is situated in line 32. The exhaust gas from the regenerator is also typically subjected to additional stages of particulates removal. The carbon monoxide reactor 68 also facilitates particulates removal.

Startup of the system can be undertaken with either adsorber 6A or adsorber 6B in adsorber service. In the following description, operation of the system will be described with adsorbers 6A and 6B initially in the adsorption and regeneration modes, respectively. Valves 46 and 62 are opened and all other valves are closed. Regenerator 4 is charged with catalyst, which may be fresh or regenerated catalyst or equilibrium catalyst, i.e. catalyst from an earlier run, and a fuel and air mixture. The fuel, preferably fuel oil, is introduced into regenerator 4 through line 30, and air is provided through lines 26 and 24. The air-fuel mixture is burned in reactor 4. As the fuel burns, the temperature of the catalyst in reactor 4 rises, and an exhaust mixture comprised mostly of carbon dioxide and nitrogen, and usually containing unconsumed oxygen, is produced. The carbon dioxide-nitrogen mixture leaves regenerator 4 through line 32, is conducted to carbon monoxide boiler 68 (if included in the system) through line 38. The exhaust gas is then pressurized, usually to a pressure in the range of about 2 to about 20 atmospheres, and sent to adsorber 6A through open valve 46 and line 48.

As the regenerator exhaust gas moves through vessel 6A, carbon dioxide is adsorbed from the gas, while nitrogen and any oxygen present pass through the adsorbent and pass out of adsorber 6A through line 60, open valve 62 and vent line 58. As the adsorption proceeds, the carbon dioxide adsorption front progresses through vessel 6A toward the nonadsorbed gas outlet end. When the adsorbed gas front reaches the desired point in adsorber 6A, the adsorption step is terminated and the adsorption cycle moves into the second phase, in which vessel 6B is put into adsorption service and vessel 6A undergoes regeneration.

In this phase of the operation valves 50, 54 and 66 are opened and all other valves are closed. Exhaust gas now enters vessel 6B wherein carbon dioxide is absorbed from the gas and nitrogen passes to vent, as described above. Meanwhile, vessel 6A is depressurized by flow of gas out through line 48 and valve 54. As the depressurization proceeds, carbon dioxide is desorbed from the adsorbent and leaves adsorber 6A through the open line. The desorbed carbon dioxide flows through lines 42 and 24 and enters regenerator 4. If desired, depressurization of vessel 6A may be assisted by means of a vacuum pump (not shown). When vessel 6A is depleted of carbon dioxide to the desired extent, and when the carbon dioxide adsorption front in vessel 6B reaches the desired point, the second phase of the adsorption process is completed and the cycle is repeated with vessel 6A in adsorption service and vessel 6B undergoing regeneration.

As the startup procedure progresses, the concentration of carbon dioxide in regenerator 4 begins to build up. To maintain the oxygen to inert diluent ratio and the total amount of oxygen entering regenerator 4 at the desired levels, it is necessary to begin introducing oxygen into regenerator 4 and to reduce the flow of air into this unit. The startup procedure is continued until the desired air to added oxygen and carbon dioxide ratio is attained, or until all of the air feed is replaced with oxygen and recycle carbon dioxide, whichever procedure is preferred.

In the embodiment in which all air is replaced by oxygen-carbon dioxide recycle gas mixture, operation of separator 6 is no longer necessary when substantially all of the nitrogen has been removed from the generator recycle system and the volume of carbon dioxide being recycled is at the desired level. At this point all valves connecting separator 6 with regenerator 4 (valves 46, 50, 54 and 56) are closed and valve 40 is opened, and separator 6 is taken out of service. Additionally in this embodiment, to prevent further buildup of carbon dioxide in regenerator 2, valve 36 is opened sufficiently to maintain the carbon dioxide concentration in the system at the desired level. Excess carbon dioxide then passes out of the system through line 34. Opening valve 36 serves the additional purpose of preventing the buildup in the system of nitrogen and other gaseous impurities, such as argon, sulfur oxides and nitrogen oxides. The vent stream leaving the system through line 34 may be vented to the atmosphere, or if it contains gaseous components that are harmful to the environment, it may be sent to downstream purification units for removal of the harmful components. For example, it may be subjected to a distillation step to remove nitrogen oxides and sulfur oxides.

In the embodiment in which a mixture of air, oxygen and carbon dioxide are used in the operation of the catalyst regeneration procedure, separator 6 may be used, either continuously or intermittently, to maintain the ratio of nitrogen and carbon dioxide in the recycle stream at the desired levels. Furthermore, flow through separator 6 may be adjusted from time to time, if it is desired to make adjustments in the concentrations of the components of the carbon dioxide recycle stream.

While the regenerator startup procedure is being carried out, reactor 2 is being readied for startup. Preparations for reactor startup include passing steam through the unit to preheat it and establish the necessary flow through line 12 to fluidize the catalyst entering this line through line 18. When these objectives are accomplished the reactor is ready for startup.

As the regenerator startup procedure progresses, the temperature of the cracking catalyst in regenerator 4 increases. When it reaches the temperature at which it is ready for use in the hydrocarbon cracking process to be performed in reactor 2, the regenerator is ready to be put into service in the cracking process. The catalyst temperature may reach its desired operating temperature during the startup procedure, i.e, before the levels of oxygen and carbon dioxide reach the desired points. In this case the hydrocarbon cracking process can be initiated in reactor 2, provided that reactor 2 is itself ready to be put into service. In the event that reactor 2 is not ready to go on line, the rate of combustion in generator 4 can be scaled back to a level that will maintain the catalyst at the desired cracking temperature during the period that reactor 2 is being readied for service. On the other hand, if the oxygen and carbon dioxide concentrations in regenerator 4 reach the desired operating levels before the catalyst in regenerator 4 reaches the desired cracking temperature, startup of the cracking process is delayed until the catalyst is hot enough to be put into service.

When both the regenerator and the cracking reactor are ready for service startup of the overall system is initiated by opening a slide valve (not shown) in line 18, which permits the hot catalyst to move downwardly through line 18 and into line 12. As the catalyst enters line 12 it is fluidized and carried upwardly into reactor 2 by the steam entering line 12 from line 14. After the catalyst flow has been stabilized, hydrocarbon feed is introduced into line 12 through line 16. The high steam flow rates to the reactor are reduced to operational levels. The temperature in the reaction zone of reactor 2 is generally maintained in the range of about 430° to about 700° C. As the hydrocarbon-catalyst mixture passes upwardly through reactor 2, the hydrocarbon undergoes cracking and the catalyst becomes coated with coke. The mixture of cracked gas and catalyst moves to the top of reactor 2, where they are separated by means of cyclone separators. The product gases pass through the cyclone separators located in section 10 and exit the reactor through line 20, and are then sent to downstream separation units for recovery of the various components of the gas mixture. The spent catalyst drops to the bottom of the cyclone separators and exits reactor 2 through line 22 and then flows into catalyst regenerator 4 where it undergoes regeneration.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis. The example illustrates the process of the invention as it applies to the catalytic cracking of a gas oil.

EXAMPLE

Summarized below are the results of simulations, which compare base-case operation for a typical FCC plant using air for regenerating catalyst (Case A) and operation using oxygen-enriched air for catalyst regeneration (Case B), with steady-operational modes using the carbon dioxide-oxygen regeneration gas mixtures obtained by the method of the invention (Cases C & D).

For Cases C and D, the process is started using air. The pressure-swing adsorption system of the invention is operated until the recycle gas is substantially comprised of carbon-dioxide. The adsorbent is silica gel, the adsorption temperature is 75° C., the adsprtion pressure is 12 psig and the desorption pressure is 400 millibar. The adsorption and bed regeneration steps of the cycle are each minutes.

For the cases illustrated, it is assumed that all of the air has been replaced by oxygen, such that the total volumetric flow rate of the carbon-dioxide-oxygen system is equal to that of the air used for Case A. The conditions and projected are reported in the Table.

TABLE

| CASE | A | B | C | D |
|---|---|---|---|---|
| Total Regeneration Gas Rate, MSCFM | 225 | 225 | 225 | 225 |
| Total Oxygen Rate, MSCFM | 47.0 | 51.7 | 47.0 | 63.6 |
| Oxygen Level, v % | 20.9 | 23.0 | 20.9 | 28.3 |
| Flue Gas Oxygen, v % | 2.0 | 2.0 | 2.0 | 2.0 |
| Reactor Temp, °C. | 527 | 527 | 527 | 527 |
| Regenerator Bed Temp, °C. | 704 | 712 | 688 | 711 |
| FCC Feed Rate, MBBL/D | 100 | 110 | 100 | 135 |
| Coke Yield, wt % | 5.2 | 5.2 | 5.2 | 5.2 |

Comparison of Cases A and C reveals that the regenerator temperature is predicted to be lowered by approximately 16°

C. for operation with the carbon-dioxide recycle gas, when the level of oxygen in the regeneration gas is equal to that present in air. The quantitative amount of reduction will vary somewhat from one FCC unit to another, and will also depend on the other operating conditions. Case B indicates that enriching regeneration air so that the oxygen content is approximately 2.1% will increase regenerator temperature by approximately 8° C. The same temperature increase for the carbon-dioxide air system in Case D, corresponds to increasing regeneration gas oxygen content to approximately 28.3%. Therefore, the amount of debottlenecking obtained can be more than doubled using the regeneration scheme of the invention.

Although the invention has been described with particular reference to a specific experiment, this experiment is merely exemplary of the invention and variations are contemplated. For example, the process of the invention may be practiced in equipment arrangements other than those illustrated in the drawings. The scope of the invention is limited only by the breadth of the appended claims.

What is claimed is:

1. A method of establishing heating of particulate matter in the presence of a gas mixture comprised of oxygen and carbon dioxide gas comprising:

(a) combusting with air, in a combustion zone containing said particulate matter, fuel selected from a hydrocarbonaceous fluid, coke deposits on said particulate matter and mixtures of these, thereby heating said particulate matter and producing exhaust gas comprising carbon dioxide and nitrogen;

(b) separating nitrogen from said exhaust gas, thereby producing carbon dioxide-enriched gas;

(c) at least partially replacing said air with oxygen and said carbon dioxide-enriched gas;

(d) when air replacement to the desired extent is attained, maintaining the concentration of carbon dioxide in the recycle gas at the desired level.

2. The method of claim 1, wherein said hydrocarbonaceous fluid is fuel oil.

3. The method of claim 1, wherein said particulate matter is hydrocarbon cracking catalyst.

4. The method of claim 3, wherein said catalyst is fresh catalyst and said fuel is fuel oil.

5. The method of claim 3, wherein said catalyst is equilibrium catalyst and said fuel is coke deposits on the surfaces of said catalyst.

6. The method of claim 3, wherein said catalyst comprises a fluidized bed.

7. The method of claim 6, wherein said combustion zone is the regenerator of a fluidized bed catalytic hydrocarbon cracking system.

8. The method of claim 3, wherein said catalyst comprises a fixed bed.

9. A continuous process for catalytically cracking hydrocarbons comprising:

A. establishing heating of hydrocarbon cracking catalyst in the presence of a gas mixture comprised of oxygen and carbon dioxide by the method of claim 4, then continuously repeating the following steps:

B. transporting heated hydrocarbon cracking catalyst from said combustion zone to a hydrocarbon cracking zone;

C. contacting a hydrocarbon feed with said heated hydrocarbon cracking catalyst in said hydrocarbon cracking zone, thereby producing a gaseous hydrocarbon product stream comprising one or more hydrocarbons of lower molecular weight than said gaseous hydrocarbon feed and depositing coke on said catalyst;

D. recovering said gaseous hydrocarbon product stream;

E. transporting coke-coated catalyst from said reaction zone to said combustion zone; and E. heating and thereby regenerating said coke-coated catalyst in said combustion zone.

10. The process of claim 9, wherein said catalyst is transported between said reaction zone and said combustion zone in a fluidized state.

11. The process of claim 10, wherein the nitrogen is separated from said gaseous exhaust by a pressure swing adsorption process.

12. The process of claim 11, wherein the adsorption step and the adsorbent regeneration step of said pressure swing adsorption process are carried out at absolute pressures in the ranges of about 2 to about 5 bar of about 200 to about 2000 torr, respectively.

13. The process of claim 18, wherein step F is carried out under conditions that result in the production of significant quantities of carbon monoxide, and the carbon monoxide is subsequently converted to carbon dioxide.

14. The method of claim 1, wherein the nitrogen is separated from said gaseous exhaust by adsorption, absorption, distillation, membrane separation or a combination of these.

15. The method of claim 14, wherein the nitrogen is separated from said gaseous exhaust by a pressure swing adsorption process.

16. The method of claim 15, wherein the adsorption step of said pressure swing adsorption process is carried out at an absolute pressure in the range of about 2 to about 5 bar.

17. The method of claim 15, wherein the adsorbent regeneration step of said pressure swing adsorption process is carried out at an absolute pressure in the range of about 200 to about 2000 torr.

18. The method of claim 1, wherein step (a) is carried out under conditions that result in the production of significant quantities of carbon monoxide, and the carbon monoxide is subsequently combusted to carbon dioxide.

19. The method of claim 1, wherein the air is partially replaced by oxygen and carbon dioxide-enriched gas.

20. The method of claim 1, wherein the air is completely replaced by oxygen and carbon dioxide-enriched gas.

21. The process of claim 1, wherein the level of carbon dioxide in the recycle gas is maintained at the desired level by continuing to separate nitrogen from said exhaust gas.

22. The process of claim 1, further comprising terminating the separation of nitrogen from said exhaust gas and recycling exhaust gas directly to said combustion zone when air replacement to the desired extent is attained.

* * * * *